(12) United States Patent
Sbalzarini

(10) Patent No.: US 8,790,166 B2
(45) Date of Patent: Jul. 29, 2014

(54) COMBINATION OF CLOSING AND SUSPENSION DEVICE FOR SAUSAGE-TYPE PACKAGING UNITS

(75) Inventor: Lino Sbalzarini, Andwil (CH)

(73) Assignee: Tipper Tie Alpina GmbH, Flawil (CH)

( * ) Notice: Subject to any disclaimer, the term of this patent is extended or adjusted under 35 U.S.C. 154(b) by 0 days.

(21) Appl. No.: 13/641,783

(22) PCT Filed: Apr. 27, 2011

(86) PCT No.: PCT/CH2011/000091
§ 371 (c)(1),
(2), (4) Date: Dec. 18, 2012

(87) PCT Pub. No.: WO2011/134095
PCT Pub. Date: Nov. 3, 2011

(65) Prior Publication Data
US 2013/0081356 A1   Apr. 4, 2013

(30) Foreign Application Priority Data
Apr. 30, 2010  (CH) .................................. 0658/10

(51) Int. Cl.
*A22C 11/00*   (2006.01)
(52) U.S. Cl.
USPC ........................................................... 452/51
(58) Field of Classification Search
USPC ..................................................... 452/21–51
See application file for complete search history.

(56) References Cited

U.S. PATENT DOCUMENTS

| 4,612,684 | A | * | 9/1986 | Kollross | 452/35 |
| 5,100,364 | A | | 3/1992 | Kollross et al. | |
| 5,857,902 | A | * | 1/1999 | Becker et al. | 452/49 |
| 8,545,293 | B2 | * | 10/2013 | Lendenmann | 452/51 |
| 2005/0159093 | A1 | | 7/2005 | Kasai | |

FOREIGN PATENT DOCUMENTS

| DE | 3300012 | 12/1983 |
| DE | 3933026 | 4/1990 |
| DE | 4013033 | 11/1990 |
| EP | 0093037 | 11/1983 |
| EP | 0424675 | 5/1991 |
| EP | 1518461 | 3/2005 |
| EP | 1891858 | 2/2008 |
| EP | 1891859 | 2/2008 |
| EP | 1891860 | 2/2008 |
| EP | 1985185 | 10/2008 |
| EP | 2008522 | 12/2008 |
| FR | 2650482 | 2/1991 |
| SU | 969226 | 10/1982 |
| WO | WO2011/134095 | 11/2011 |

OTHER PUBLICATIONS

English language translation of the International Search Report for corresponding PCT Application No. PCT/CH2011/000091, mail date May 9, 2011.

* cited by examiner

*Primary Examiner* — Richard Price, Jr.
(74) *Attorney, Agent, or Firm* — Myers Bigel Sibley & Sajovec, P.A.

(57) ABSTRACT

The invention relates to a combination consisting of a closing device (1) for sausages and a suspension device (2) for the sausages. The closing device is arranged at an angle relative to the suspension device, allowing very long sausages to be closed and suspended.

14 Claims, 6 Drawing Sheets

Figure 1:
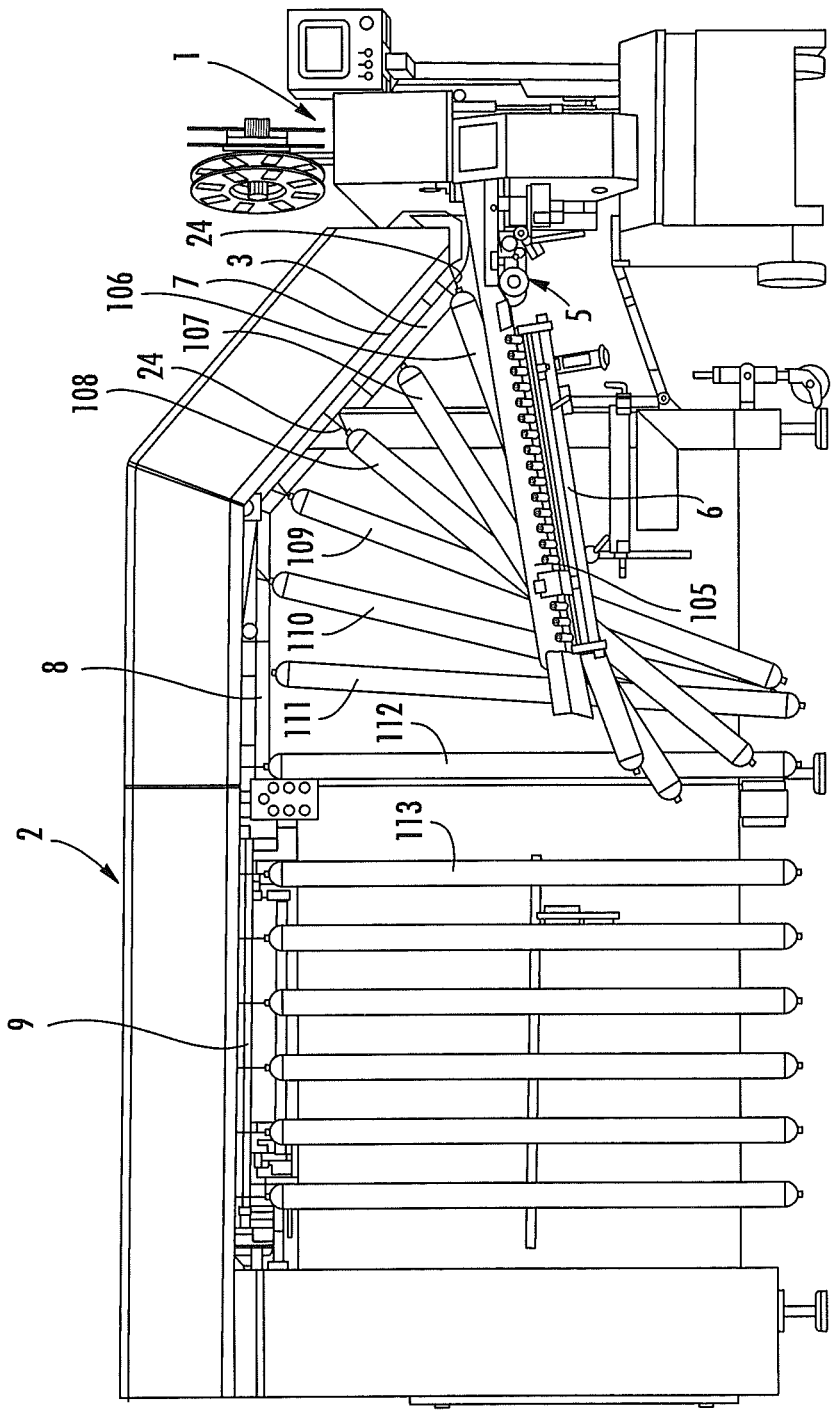

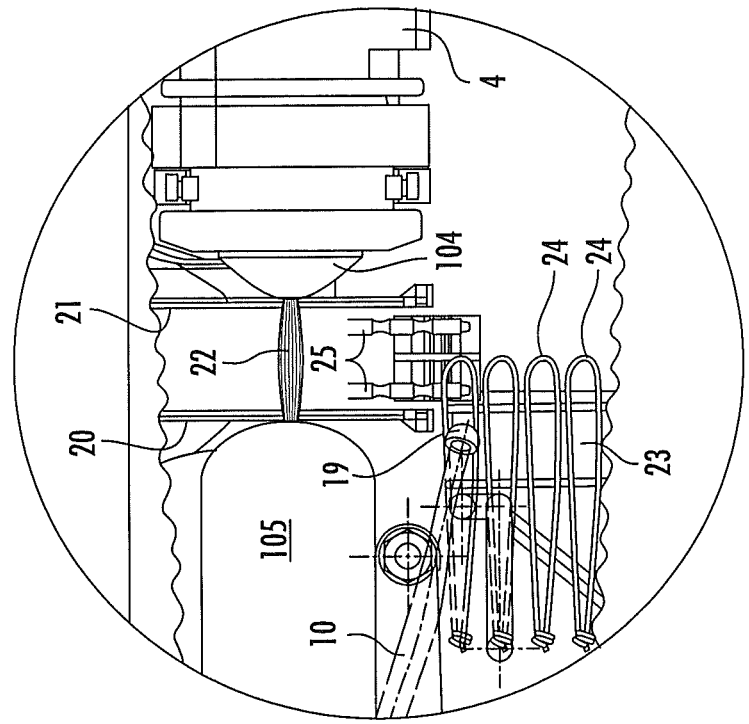
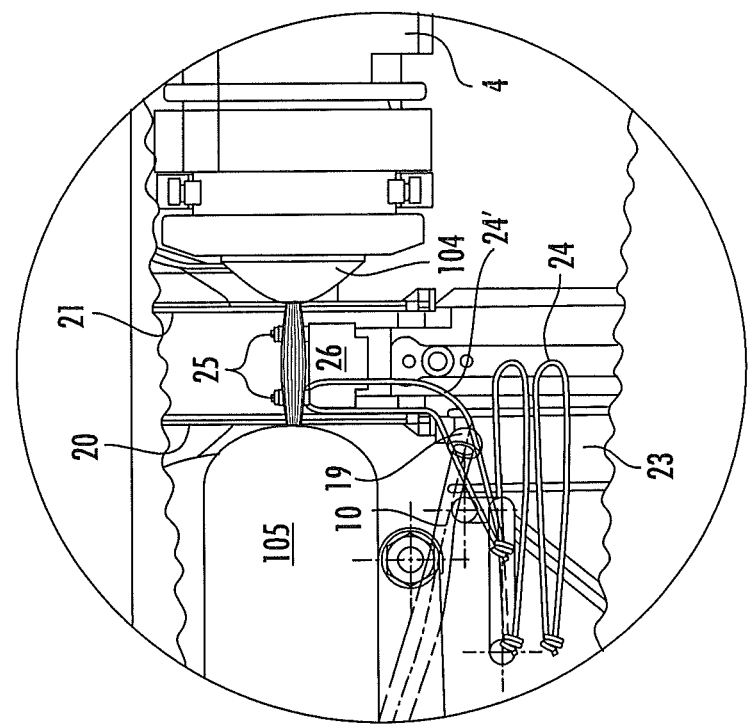

COMBINATION OF CLOSING AND SUSPENSION DEVICE FOR SAUSAGE-TYPE PACKAGING UNITS

RELATED APPLICATIONS

This application is a 35 USC §371 national phase application of PCT/CH2011/000091, filed Apr. 27, 2011, which claims the benefit of and priority to Swiss Application Serial No. 658/10 filed Apr. 30, 2010, the contents of which are hereby incorporated by reference as if recited in full herein.

FIELD OF THE INVENTION

The invention relates to an arrangement comprising a closing device for forming elongated, sausage-type packaging units which are closed at both ends by clips, with a closing tool arrangement defining a throughput section for the packaging units and with a hanging loop feeder which supplies hanging loops to a closing tool of the closing tool arrangement for their attachment to one of the ends of the packaging units by means of the clips attached thereto, as well as comprising a suspension device having a catching arrangement for the hanging loops and a transport arrangement by means of which the packaging units are transported suspended on the hanging loops and are drawn onto smoke sticks and deposited thereon.

BACKGROUND

Closing devices, so-called clip machines, are known, e.g. from DE-A-40 13 033. Such devices particularly have a pair of displacement shears as closing tool. The displacement shears constrict the tubular packaging inserted into the shears in an opened position of the shears by closing the shears, wherein both shears are located side by side (shirring process). After the constriction or the shirring respectively, the one shear is displaced laterally or in the longitudinal direction of the packaging respectively, away from the other shear which is fixed, whereby the product located in the packaging is pushed out of the area situated between the shears and therefore a product-free area (sausage end) is created between the formed sausage-type packaging units or sausages respectively, in which the closing clip or closing clips is or are subsequently applied by means of a closing tool. During this, the sausage end may also be cut between the sausages in order to form individual sausages. Normally two clips are applied, that is to say the second clip for the leading sausage and the first clip for the subsequent sausage. When the second clip is applied, a hanging loop is attached to the sausage or to the last of a series of connected sausages by means of the clip, if this is desired. The sausage or the series of sausages may be suspended on a smoke stick by means of the hanging loop.

Arrangements consisting of a closing device and a suspension device, which allow for suspending the sausages exiting the closing device on smoke sticks without manual intervention, are known from the European patent applications EP 1 891 858 A1, EP 1 891 859 A1 and EP 1 891 860 A1. In these cases the closing device and the suspension device are arranged in a line. These arrangements have proved their worth. However, these arrangements are not suitable for particularly long sausages or sausage chains, which have e.g. a length of between a meter and two meters.

DESCRIPTION OF THE INVENTION

The objective of the invention is to provide an arrangement consisting of a closing device and a suspension device for automatically closing and suspending sausage-type packaging units, which are also suitable for very long packaging units.

This objective is solved by the arrangement mentioned at the beginning in such a way that as seen from the top the closing device is arranged angled to the transport direction of the transport arrangement, in such a way that the direction of the throughput section is positioned at an angle with respect to the transport direction.

By arranging the entire closing device at an angle, very long sausages can be delivered also without the risk that sausages collide. The positioning at an angle of the closing device as a whole avoids this more reliably than an angled position of only an output element, e.g. of a conveyor belt at the output of the closing device. The result is an alignment of each packaging with the transport device and a freeing of space of each packaging with regard to the subsequent packaging.

A conveyor belt at the output of the closing device is preferably provided, running in the direction of the throughput section. Furthermore, a tiltable receptacle for individual sausages is provided. By this, a sausage can be received securely in the direction of the throughput section and can only subsequently be released in the transport direction by tilting it, if the previous sausages have taken on a position which avoids damage of sausages. Preferably, a catching surface for a plurality of sausages which were previously delivered from the tiltable receptacle is furthermore provided, which supports the sausages at the beginning during transport along the transport arrangement, such that they raise gradually and can get into the suspension position. This also avoids damage of the sausages and particularly avoids that they lie upon one another, because the catching surface causes consecutive, tilted sausages to lie side by side. Particularly, the catching surface may be provided for support along a rising section of the transport device and preferably additionally also along a part of a subsequent horizontal section of the transport device. The rising section causes together with the catching surface a raising of the sausages and consequently also space for the following sausages.

SHORT DESCRIPTION OF THE DRAWINGS

Figure 2:
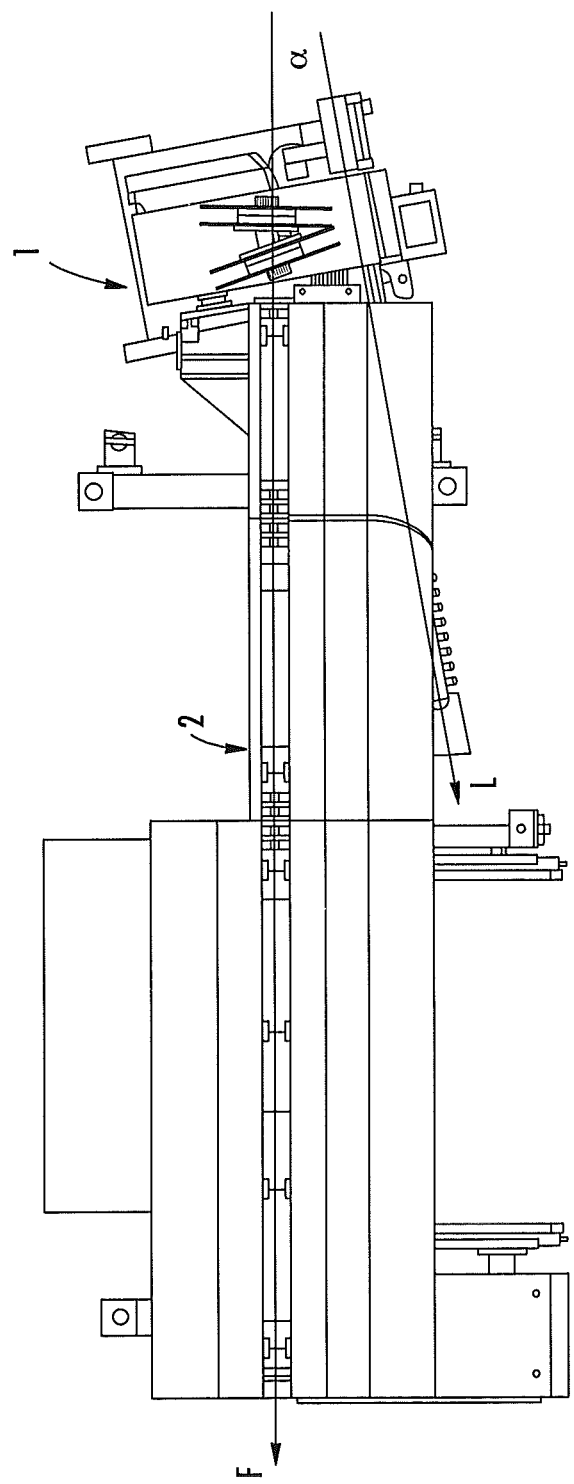
Figure 5:
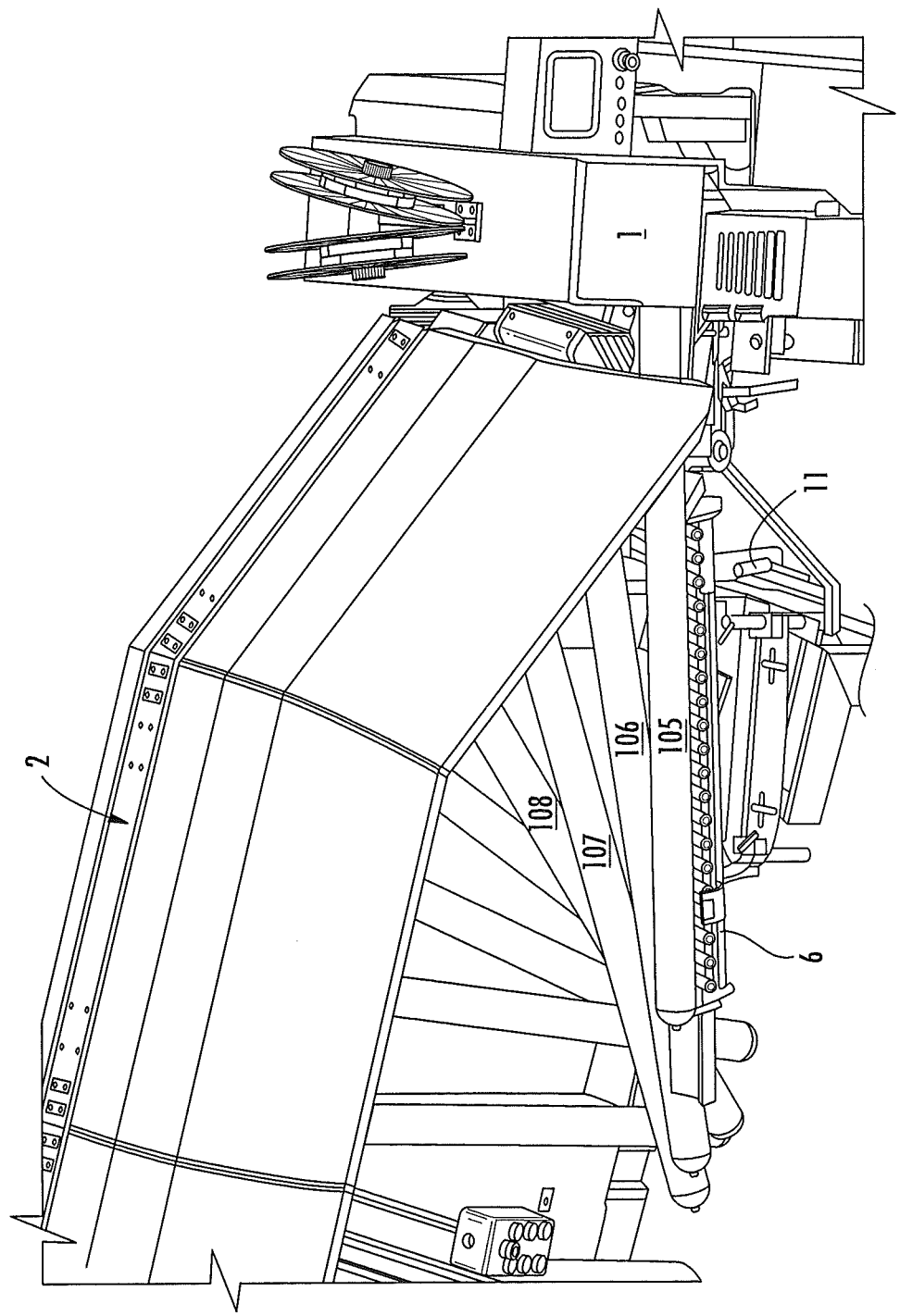
Figure 6:
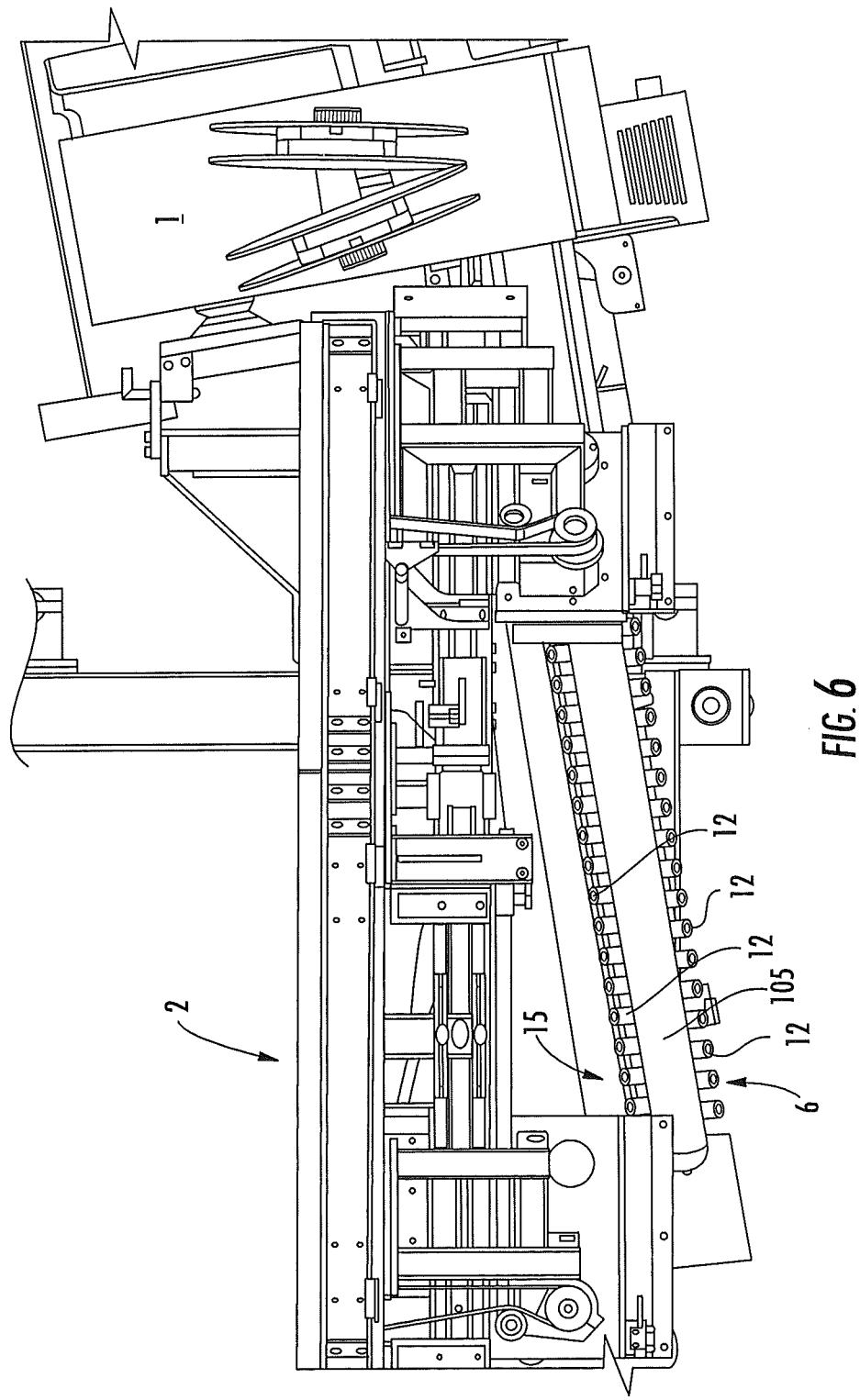
Figure 7:
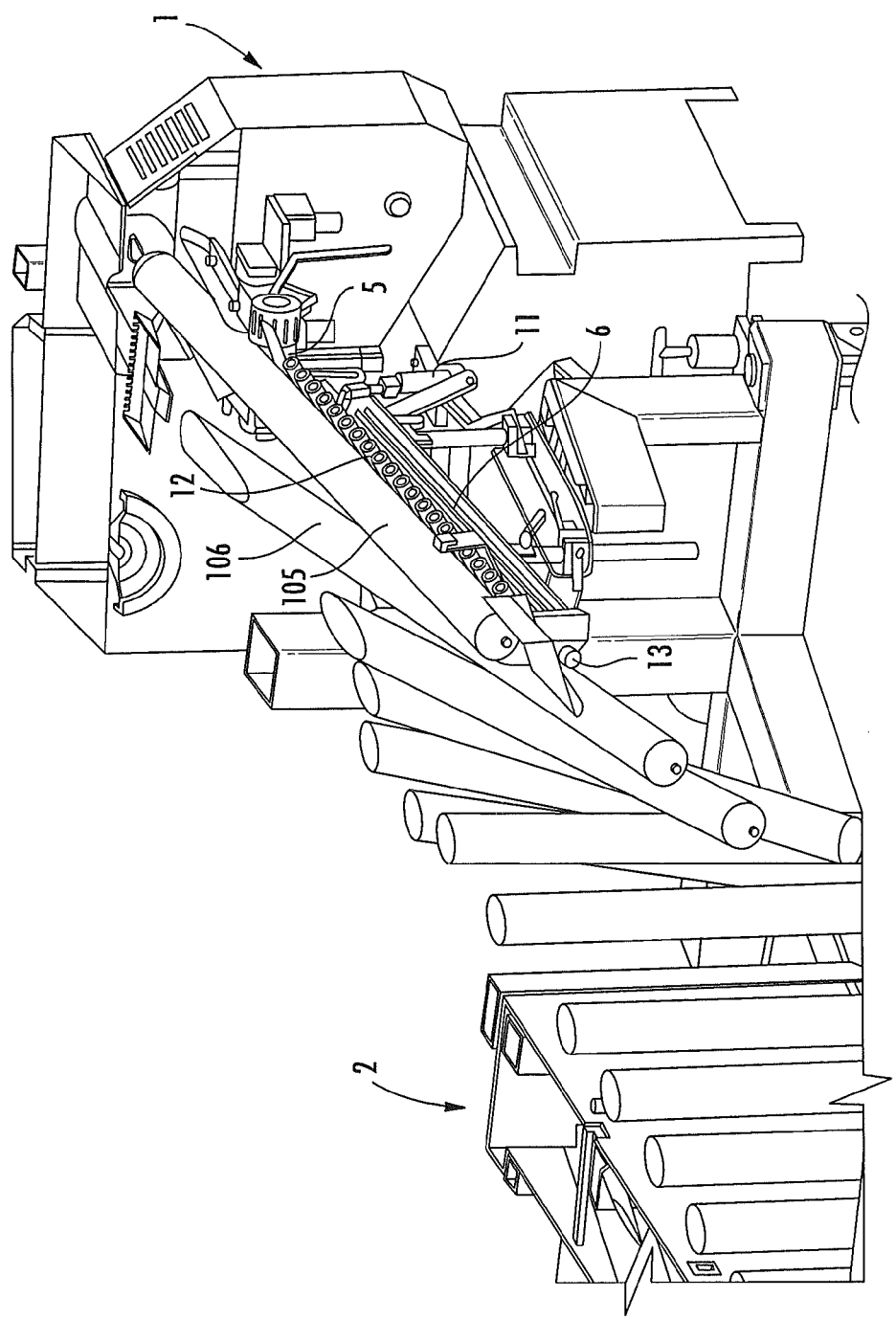

In the following, embodiments of the invention are described in more detail by means of the drawings. Thereby it is shown in FIG. 1 a view of an arrangement consisting of a closing device and a suspension device;

FIG. 2 a top view on the arrangement of FIG. 1;

FIG. 3 the illustration of a first position of the closing tools;

FIG. 4 the illustration of a second position of the closing tools;

FIG. 5 an oblique top view on the closing device and a part of the suspension device;

FIG. 6 a top view on the closing device and the tiltable receptacle of the arrangement according to FIG. 1; and FIG. 7 a view on the output of the closing device.

WAYS FOR CARRYING OUT THE INVENTION

FIG. 1 shows in a side view the arrangement comprising of a closing device 1 for sausage-type packaging units and a suspension device 2 for such packaging units, to which a hanging loop 24 has been attached in the closing device. A filling device, which is not shown, would be arranged on the right side of the closing device 1, the filling tube of which protrudes into the closing device, as known. This will be explained in more detail by FIGS. 3 and 4. In FIG. 1 it can be seen how a very long sausage-type packaging 105 leaves the closing device and lies on a conveyor belt 5 and a tiltable receptacle 6. Previously, the additional packaging units with reference numerals 106-113 also have successively left the closing device 1 in this way. After the attachment of the hanging loop 24 to the respective packaging unit, this hanging loop is gripped by the transport device 2, such that the corresponding packaging unit is transported further by transporting the hanging loop 24, after it has left the closing device. This takes place in the preferred example first at a rising section 7 of the transport device 2 and after that at a following horizontal section 8 of the transport device 2. Thereafter, a transfer to a further horizontal transport section 9 takes place, on which the packaging units are suspended on a smoke stick in a known way. For this suspension or the positioning and releasing respectively, of the packaging units, it is pointed to the European patent application EP 1 891 859, in which such a transfer to a smoke stick is shown in detail in the sections [0009] to [0013] and by the figures. This description is brought to the attention of the skilled person and it is incorporated herein by reference.

As can be seen in FIG. 2, the closing device 1 is angled with respect to the transport device 2 according to the present invention. In FIG. 2 the transport direction F of the transport device is shown by a corresponding arrow. The closing device 1 as a whole is arranged in an angled position with respect to the transport device in such a way that the throughput section of the packaging units forms, by the closing tools, an angle α of e.g. 10-20 degrees with respect to the transport direction F. The throughput section has the direction L, as shown by means of the arrow. It can be seen that the packaging unit 105 has left the closing device 1 in this direction in a lying position. The closing of the packaging units or the sausages, respectively, is carried out in the known way shown in FIGS. 3 and 4. Regarding this, attention is drawn to the European patent application EP 1 891 860, where this is described.

FIG. 3 shows the closing tool arrangement which also defines the throughput section for the sausage-type packaging units. Here, the end of the filling tube 4 which protrudes into the closing device can also be seen. More precisely, the hanging loop feeder 23 can be seen here feeding individual hanging loops 24 in the area of the closing tool of the closing device 1. The hanging loops 24 can be attached to a carrier band which is not shown here in more detail or they can be attached to one another punctually, such that they form a transportable unit which is carrier-band-free; this is known to the skilled person and is not shown here in more detail. Furthermore, in FIG. 3 the means for forming the sausage end 22 are shown, which are preferably formed in a known way by shear pairs 20 and 21. When these are opened the packaging units can travel along the throughput section. The filling-product-free section or sausage end 22 is formed in the figures between the packaging units 105 and 104, wherein the packaging unit 105 is already filled, such that the end clip is attached thereto and the packaging unit 104 is being filled, such that the start clip is attached thereto. Correspondingly, both clip wire lines 25 for the end clip or start clip respectively, of each packaging unit and the corresponding lower tool or the die 26 are shown in FIG. 3. The known corresponding upper tool (stamp) is not shown. FIG. 3 shows the position of the closing tool before the closing procedure. The shown preformed clip wires 25 and their closing tools are known to the skilled person and are not described here in detail. Furthermore, the front part of a blade end part 10 with the free end 19 is shown in FIG. 3 as a catching arrangement of the suspension device, which is provided for catching the hanging loop 24' or the following hanging loop 24. The hanging loop 24 is drawn onto the blade end part 10 by the closing tool 26. This can be seen in FIG. 4 which shows in a side view that the tool 26 is brought up in the closing position, whereby the hanging loop 24' has been taken by the clip wire located in the tool, in order to be attached to the sausage end 22 when the clip is closed around it. During bringing up the closing tool 26, the hanging loop 24' is collected by the end of the blade 10 or the hanging loop is drawn onto the blade 10 respectively. The hanging loop drawn onto the blade end part 10 is captured securely when it is moved along the transport means or the conveyor belt 5 respectively while the sausage-type packaging units are moved away by it. A more precise description of the capture of the hanging loops is given in EP 1 891 860, which is incorporated herein, particularly according to the section [0015] of this document.

Further preferred embodiments of the invention are described by FIG. 1 and particularly by FIGS. 5-7. It can be seen that a transport means, particularly a conveyor belt 5, is preferably provided, which transports the packaging unit along the throughput section through the closing device 1. The conveyor belt 5 is aligned in the direction of L of the throughput section, such that the packaging is transported by the conveyor belt straight through the throughput section. The conveyor belt is formed at its end in such a way that the belt may cede at its end such that the packaging unit which is almost completely or completely filled causes a deformation of the belt which is adapted to the shape of the sausage, such that the packaging unit, which doesn't lie on the belt anymore, in the rear area of it, after the closing and cutting of the sausage end, is still transported safely, as can be seen in FIG. 7. As long as the packaging is processed in the closing device according to FIGS. 3 and 4, it lies substantially horizontally with its end which shall be closed, however it bends along its length, this not being shown in the figures. Preferably, the exiting packaging unit is transferred, after the closing device, downwards onto a tiltable receptacle 6, wherein "downwards" refers to the storage surface of the closing device. The receptacle is tiltable about a tilt axis 13 and a pneumatic or hydraulic or electric tilt cylinder 11 may be responsible for the tilt movement. By this, the packaging unit located on the receptacle 6 can be tilted laterally in the direction of the other packaging units 106, 107 etc. The receptacle 6 is preferably formed by a plurality of rolls 12 or bands, which are present for the packaging unit in a concave and V-shaped arrangement and which guides it in the correct direction. The provision of the tiltable receptacle makes sure that the packaging units come to lie side by side and not on top of one another, which could lead to a malfunction of the transportation. The transport device 2 grips the hanging loop 24 of each packaging unit at the end of the blade 10. For this, the latter may be provided with a groove over which the hanging loop moves and which causes the gripping of the hanging loop by a gripper which is lowered into the groove. These grippers are e.g. attached to chain transport means, such that they pull and move the packaging units along corresponding carriage arms. This is known to the skilled person and is not described in more detail here. In FIG. 1 it is possible to see that preferably first a rising section 7 of the transport device and after that a horizontal section 8 of the transport device is provided. The carriage arms or blades respectively, on which the hanging loops travel, are held freely, as known, such that the corresponding support means moves away from the blade or carriage arm respectively, for a short period of time, when the hanging loop 24 moves through. This is e.g. known from the European patent application EP 1 891 859 and it is particularly pointed to the section [0011] of this document and the related figures, which are incorporated herein by reference.

It is preferred, as seen in FIG. 6, that a rest or a supporting surface 15 is arranged below the tiltable receptacle 6. It supports the packaging unit during the transport along the section 7 and also partially along the section 8, as can be seen in FIG. 1 by the corresponding positions of the packaging units. The supporting surface 15 itself can however be seen only partially in FIG. 5. On the other hand, the supporting effect of the surface 15 on the packaging units can also be seen in FIG. 7 which shows the packaging units only partially. This surface 15 consists e.g. of a surface forming a curved surface, particularly of metal. It may be provided with mouldings or a surface structure respectively, yielding an as small as possible friction for the packaging units and/or with a friction reducing coating. The supporting surface 15 is preferably adjustable in its inclination with respect to the horizontal, such that it can be adjusted with respect to its position depending on the length and diameter of the packaging, in order to influence the rising and the freeing of space of a packaging with respect to the subsequent packaging units.

The invention claimed is:

1. Arrangement comprising:
   (a) a closing device for forming elongated, sausage-type packaging units which are closed at both ends by clips, with a closing tool arrangement defining a throughput section for the packaging units and with a hanging loop feeder which supplies hanging loops to a closing tool of the closing tool arrangement for their attachment to one of the ends of the packaging units by means of the clip applied there; and
   (b) a suspension device having a catching arrangement for the hanging loops and a transport arrangement by means of which the packaging units are transported suspended on the hanging loops and are drawn on smoke sticks and deposited thereon,
   characterized in that the closing device is arranged angled to the transport direction of the transport arrangement as seen from the top, in such a way that the direction of the throughput section (LD) is angled with respect to the transport direction (F).

2. Arrangement according to claim 1, characterized in that a conveyor belt running substantially horizontally is provided after the throughput section, being provided from a tiltable receptacle for the packaging units exiting in the direction of the throughput section, wherein the receptacle is adapted, as seen from the top, to adopt in its idle state a reception position, which is oriented in the same direction as the direction of the throughput section, for a packaging unit exiting the closing device and to adopt in its tilted state a tilted position ejecting the packaging unit laterally out of the reception position.

3. Arrangement according to claim 2, characterized in that the receptacle is formed by a plurality of rolls or bands arranged concavely in a V-shape.

4. Arrangement according to claim 3, characterized in that a supporting surface for a plurality of sausages which were previously ejected from the tiltable position is further provided, which is arranged and adapted to support packaging units of predetermined minimum length in a rising transport section of the transport arrangement during the transport along the transport arrangement.

5. Arrangement according to claim 3, characterized in that the supporting surface is arranged and formed in such a way that packaging units of predetermined minimum length are supported on the supporting surface in a horizontal transport section following the rising transport section along a section of it.

6. Arrangement according to claim 2, characterized in that a supporting surface for a plurality of sausages which were previously ejected from the tiltable position is further provided, which is arranged and adapted to support packaging units of predetermined minimum length in a rising transport section of the transport arrangement during the transport along the transport arrangement.

7. Arrangement according to claim 6, characterized in that the supporting surface is arranged and formed in such a way that packaging units of predetermined minimum length are supported on the supporting surface in a horizontal transport section following the rising transport section along a section of it.

8. Arrangement according to claim 2, characterized in that the supporting surface is arranged and formed in such a way that packaging units of predetermined minimum length are supported on the supporting surface in a horizontal transport section following the rising transport section along a section of it.

9. Arrangement according to claim 1, characterized in that a supporting surface for a plurality of sausages which were previously ejected from the tiltable position is further provided, which is arranged and adapted to support packaging units of predetermined minimum length in a rising transport section of the transport arrangement during the transport along the transport arrangement.

10. Arrangement according to claim 9, characterized in that the supporting surface is arranged and formed in such a way that packaging units of predetermined minimum length are supported on the supporting surface in a horizontal transport section following the rising transport section along a section of it.

11. Arrangement according to claim 1, characterized in that the supporting surface is arranged and formed in such a way that packaging units of predetermined minimum length are supported on the supporting surface in a horizontal transport section following the rising transport section along a section of it.

12. A packaging apparatus comprising:
    (a) a closing device with a closing tool arrangement defining a throughput section with a throughput direction for sausage type packaging units that are closed at both ends by clips on each end;
    (b) a hanging loop feeder which supplies hanging loops to a closing tool of the closing tool arrangement for their attachment to one of the ends of the packaging units; and
    (c) a suspension device having a catching arrangement for the hanging loops and a transport arrangement with a transport direction which transports the packaging units suspended on the hanging loops to smoke sticks,
    characterized in that, as seen from a top of the apparatus, the throughput section direction is angled outward with respect to the transport direction.

13. The packaging apparatus of claim 12, wherein the closing device throughput section comprises a conveyor belt running substantially horizontally, and wherein the apparatus further comprises a tiltable receptacle for the packaging units exiting in the direction of the throughput section, wherein the receptacle is adapted, as seen from the top, to adopt in its idle state a reception position, which is oriented in a common direction as the direction of the throughput section, for a packaging unit exiting the closing device and to adopt in its tilted state a tilted position ejecting the packaging unit laterally out of the reception position.

14. A packaging apparatus comprising:
(a) a closing device with a closing tool arrangement defining a throughput section with a throughput direction for long sausages having a length between 1-2 meters that are closed at both ends by clips;
(b) a hanging loop feeder which supplies hanging loops to a closing tool of the closing tool arrangement for their attachment to one of the ends of the packaging units; and
(c) a suspension device having a catching arrangement for the hanging loops and a transport arrangement with a transport direction which transports the packaging units suspended on the hanging loops,
wherein, as seen from a top of the apparatus, the throughput section direction is angled outward with respect to the transport direction.

* * * * *